(12) United States Patent
Carus et al.

(10) Patent No.: US 9,002,710 B2
(45) Date of Patent: Apr. 7, 2015

(54) SYSTEM AND METHOD FOR APPLYING DYNAMIC CONTEXTUAL GRAMMARS AND LANGUAGE MODELS TO IMPROVE AUTOMATIC SPEECH RECOGNITION ACCURACY

(75) Inventors: Alwin B. Carus, Waban, MA (US); Larissa Lapshina, Shirley, MA (US); Raghu Vemula, Wilmington, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/611,351

(22) Filed: Sep. 12, 2012

(65) Prior Publication Data

US 2013/0006632 A1     Jan. 3, 2013

Related U.S. Application Data

(63) Continuation of application No. 11/392,900, filed on Mar. 29, 2006, now Pat. No. 8,301,448.

(51) Int. Cl.
*G10L 15/00* (2013.01)
*G10L 15/183* (2013.01)

(52) U.S. Cl.
CPC .................. *G10L 15/183* (2013.01)

(58) Field of Classification Search
USPC .......... 704/246, 247, 251, 252, 257
See application file for complete search history.

(56) References Cited

U.S. PATENT DOCUMENTS

| | | | |
|---|---|---|---|
| 5,027,406 A | 6/1991 | Roberts et al. | |
| 5,960,399 A | 9/1999 | Barclay et al. | |
| 6,052,657 A | 4/2000 | Yamron et al. | |
| 6,104,989 A | 8/2000 | Kanevsky et al. | |
| 6,122,613 A | 9/2000 | Baker | |
| 6,125,347 A | 9/2000 | Cote et al. | |
| 6,246,981 B1 | 6/2001 | Papineni et al. | |
| 6,490,561 B1 | 12/2002 | Wilson et al. | |
| 6,529,902 B1 | 3/2003 | Kanevsky et al. | |
| 6,772,120 B1 | 8/2004 | Moreno et al. | |
| 7,035,789 B2 | 4/2006 | Abrego et al. | |
| 7,177,814 B2 | 2/2007 | Gong et al. | |
| 7,197,460 B1 | 3/2007 | Gupta et al. | |
| 7,286,984 B1 | 10/2007 | Gorin et al. | |
| 7,290,207 B2 | 10/2007 | Colbath et al. | |
| 7,529,756 B1 | 5/2009 | Haschart et al. | |
| 7,584,103 B2 | 9/2009 | Fritsch et al. | |

(Continued)

FOREIGN PATENT DOCUMENTS

| | | |
|---|---|---|
| EP | 1366490 | 9/2004 |
| WO | WO 2005/050474 | 6/2005 |

*Primary Examiner* — Leonard Saint Cyr
(74) *Attorney, Agent, or Firm* — Wolf, Greenfield & Sacks, P.C.

(57) ABSTRACT

The invention involves the loading and unloading of dynamic section grammars and language models in a speech recognition system. The values of the sections of the structured document are either determined in advance from a collection of documents of the same domain, document type, and speaker; or collected incrementally from documents of the same domain, document type, and speaker; or added incrementally to an already existing set of values. Speech recognition in the context of the given field is constrained to the contents of these dynamic values. If speech recognition fails or produces a poor match within this grammar or section language model, speech recognition against a larger, more general vocabulary that is not constrained to the given section is performed.

17 Claims, 3 Drawing Sheets

(56) References Cited

U.S. PATENT DOCUMENTS

| | | |
|---|---|---|
| 7,660,400 B2 | 2/2010 | Bangalore et al. |
| 7,869,998 B1 | 1/2011 | Di Fabbrizio et al. |
| 7,958,443 B2 | 6/2011 | Rosen et al. |
| 8,041,566 B2 | 10/2011 | Peters et al. |
| 8,200,487 B2 | 6/2012 | Peters et al. |
| 8,332,221 B2 | 12/2012 | Peters et al. |
| 8,356,243 B2 | 1/2013 | Rosen et al. |
| 2002/0087315 A1 | 7/2002 | Lee et al. |
| 2003/0018668 A1 | 1/2003 | Britton et al. |
| 2003/0033146 A1 | 2/2003 | Morin et al. |
| 2003/0154085 A1 | 8/2003 | Kelley |
| 2003/0200094 A1 | 10/2003 | Gupta et al. |
| 2004/0254791 A1 | 12/2004 | Coifman et al. |
| 2005/0192807 A1 | 9/2005 | Emam et al. |
| 2006/0041427 A1 | 2/2006 | Yegnanarayanan et al. |
| 2006/0149551 A1 | 7/2006 | Ganong et al. |

SYSTEM AND METHOD FOR APPLYING DYNAMIC CONTEXTUAL GRAMMARS AND LANGUAGE MODELS TO IMPROVE AUTOMATIC SPEECH RECOGNITION ACCURACY

RELATED APPLICATIONS

This application is a continuation of co-pending U.S. patent application Ser. No. 11/392,900, entitled "SYSTEM AND METHOD FOR APPLYING DYNAMIC CONTEXTUAL GRAMMARS AND LANGUAGE MODELS TO IMPROVE AUTOMATIC SPEECH RECOGNITION ACCURACY," filed on Mar. 29, 2006, issued as U.S. Pat. No. 8,301,448 on Oct. 30, 2012, the entirety of which is incorporated herein by reference.

BACKGROUND OF INVENTION

The present invention relates generally to a system and method for the loading and unloading of dynamic grammars and section-based language models in a speech recognition system.

For most speech recognition applications, training speakers to dictate in an organized fashion is essential to increasing the efficiency of the system. A speaker trained to dictate certain language necessary for domain-based diagnosis, reporting, and billing documents can greatly increase the accuracy and efficiency of report generation. In addition, a speaker trained to dictate certain section-specific information in an organized and orderly fashion will further increase the accuracy and efficiency of the speech recognition system. However, even the best trained speaker can improve the accuracy and efficiency of an overall speech recognition system by only so much.

Speech recognition systems have for many years been designed with language models specific to certain domains. For example, a speech recognition system with a language model in the radiology domain will improve efficiency of the speech recognition engine when compared to such a system implemented with a general domain language model. The domain-specific language model is typically created using documents from the intended discipline of the speaker.

Specific domain language models are advantageous over general domain language models because the data within the specific domain language model is uniquely tailored to the intended speakers in that particular domain. The data within the specific domain language model is narrower when compared to the general domain language model, hence any speech recognition engine will be able to work more accurately and efficiently with a narrower domain.

Notwithstanding the advancements in speech recognition over the last few years, further advancement is still possible. For example, it is well known that different medical disciplines require certain documents and reports. It is also well known that documents can be further broken down into sections and sub-sections. In the medical field, virtually every medical document consists of headings and subheadings where information related to these headings and subheadings is often quite distinct in structure and content from other sections of the document. For example, a discharge summary report will likely have a section that deals with the patient's history and physical examination, typically a narrative section. There may be another section that concerns the principle diagnosis, which is typically a list of disease names. Another section to may include medications which themselves have an organization and content quite distinct from everything else in the document. This relationship between document structure and content is pervasive in medical reports and also common in other disciplines. Although some sections are more narrative and some are more structured in very specific ways, these structures tend to be fairly limited and repetitive within a given section. Narrative sections can be also highly repetitive utilizing a limited number of lexical and structural patterns. It is possible to exploit these repetitive patterns to improve accuracy and efficiency in report generation through automatic speech recognition.

Distinct section organization of reports and repetitive structural and lexical characteristics of sections is not limited to the medical domain; it is also found in other domains, such as public safety, insurance, and many others.

Most automatic speech recognition applications accommodate for the particular domain by developing domain-specific language models that relate to the discipline itself rather than to any kind of structural and organizational regularity in reports in the specific domain. Hence, in the medical domain, there typically exists either a general medical language model or more likely a language model that is very specific to the discipline or sub-discipline. For example, language models might be developed which are very specific to the documents and the language that are used by physicians in general in oncology, pediatrics, or other particular sub-disciplines.

In the event a physician practices across several medical domains, the physician may switch dictation domains from general domain dictation to specific domain dictation; or from one specific domain to another specific domain. The physician may dictate a letter that has general medical content which is quite different from a technical report such as a cardiac operative note. In this example, the speech recognition system needs to be nimble enough to switch from a general language model to a more specific language model.

It has been found that a speech recognition system having the ability to change domains within the context of a single document is desirable. Complicating this situation is the fact that there are no standards for the structure and organization of medical reports. Therefore, there exists a need for a speech recognition system having the ability to change domains within the context of a single document in any arbitrary way.

There have been attempts to improve speech recognition by using a language model that changes domains within the document context. Such a system is described in published U.S. patent application 20040254791 entitled "Method and Apparatus for Improving the Transcription Accuracy of Speech Recognition Software" with listed inventors Coifman, et al. Coifman et al. use standard and already existing automatic speech recognition technologies to perform contextual and adaptive ASR by domain, document type, and speaker. Coifman, et al., teach the use of sub-databases having high-likelihood text strings that are created and prioritized such that those text strings are made available within definable portions of computer-transcribed dictations as a first-pass vocabulary for text matches. If there is no match within the first-pass vocabulary, Coifman, et al. teach a second pass where the voice recognition software attempts to match the speech input to text strings within a more general vocabulary. This system as taught by Coifman, et al. is known as a two-pass system. A drawback exists in the two-pass system in that it requires an assumption that there exists well-defined structured data, most likely input field type data. Such a system is not applicable in any environment existing off-line, such as a traditional telephony dictation system, without structure because there is no mechanism to identify structural units, their respective contents, and how the units will interact with the system. Unlike a freeform dictation approach, the two-pass system requires defined and clearly delimited data fields within the speaker dictates.

In addition, the two-pass system requires the use of a fixed set of word combinations or "text strings" for each data field which limits the repertoire of text strings to those that have been observed to have been dictated or are allowed in certain sections or fields.

Further, the two-pass system requires the use of a general vocabulary recognition system if no match is made to this repertoire of text strings, and as opposed to a speech recognition system that has vocabulary and grammatical constraints provided by knowledge of the text strings that have been observed to have been dictated in certain sections or fields.

Heretofore, there has been no system or method for loading and unloading of dynamic grammars and section-based language models in an automatic speech recognition system.

There exists a need for such a system and method that can operate with clearly defined data fields, but does not require the use of data fields within which the speaker dictates.

There also exists a need for such a system and method that is constrained by knowledge of the text strings that have been observed to have been dictated in certain sections or fields.

There also exists a need for such a system and method that is not limited by vocabulary and grammatical constraints provided by knowledge of the text strings that have been observed to have been dictated in certain sections or fields.

There also exists a need for such a system and method that dynamically identifies the larger context in which words are being used, with or without the presence of headings or key words, and applies section language models or grammars when there is evidence in the dictation that it could be used.

SUMMARY OF INVENTION

The present invention includes a system and method for loading and unloading of dynamic grammars and language models in a speech recognition system used for structured and unstructured document recognition. The values of the sections of the document are either selectively determined in advance from a collection of documents of the same domain, document type, and speaker, or collected incrementally from documents of the same domain, document type, and speaker, or added incrementally to an already existing set of values. Speech recognition in the context of the given field is constrained to the contents of these dynamic values. In the event speech recognition fails or produces a poor match within this grammar or language model, speech recognition against a larger, more general vocabulary that is not constrained to the given field may be performed.

In a first aspect, the present invention a method for loading and unloading dynamically constructed and identified language model or grammar data in an automatic speech recognition system having a structured report organization including determining sections used for the structured data input, determining content within said sections for the structured data input, based on said content, creating a recognition language model data, determining a section status for said structured section input, based on said section status, loading a corresponding recognition language model or grammar data into the automatic speech recognition system, and conducting speech recognition of the structured data input using said corresponding recognition language model or grammar data.

In some embodiments there includes identifying text document sections from the structured report organization and collecting the text from identified document sections.

Some embodiments include assembling sections of a document in said speech recognized. structured data input and determining automatic section headings. The collected text may be combined from the identified document sections and the determined automatic section headings.

In some embodiments there may include training of section language models and section grammars based on the combined text from the identified document sections and the determined automatic section headings. Speech recognition may be conducted based on combined text from the identified document sections and the determined automatic section headings. Training data may also be assembled.

Some embodiments include, based upon the assembled training data, creating either a smoothed section language model, an unsmoothed section language model or section grammars list. For a created smoothed section language model speech recognition may be conducted with the smoothed section language model. For a created unsmoothed section language model or a created section grammars list speech recognition may be conducted with the unsmoothed section language model.

In still other embodiments a confidence level evaluation is performed. Where the confidence level evaluation meets a pre-determined threshold value, the identified documents sections and determined automatic section headings are assembled into at least one finished document. Where the confidence level evaluation does not meet a predetermined threshold value a generic language model may be inputted into the speech recognition system.

In some embodiments the generic language model may be derived from a factory, site or user specific language model and speech recognition may be conducted with the generic language model.

In some embodiments the speech recognition results from the generated section language model or section grammar list and speech recognition results from the generic language model may be compared. Based upon the comparison, the identified documents sections and determined automatic section headings may then be assembled into at least one finished document.

BRIEF DESCRIPTION OF DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numeral designate like parts throughout the Figures, wherein:

DETAILED DESCRIPTION OF INVENTION

Figure 1:
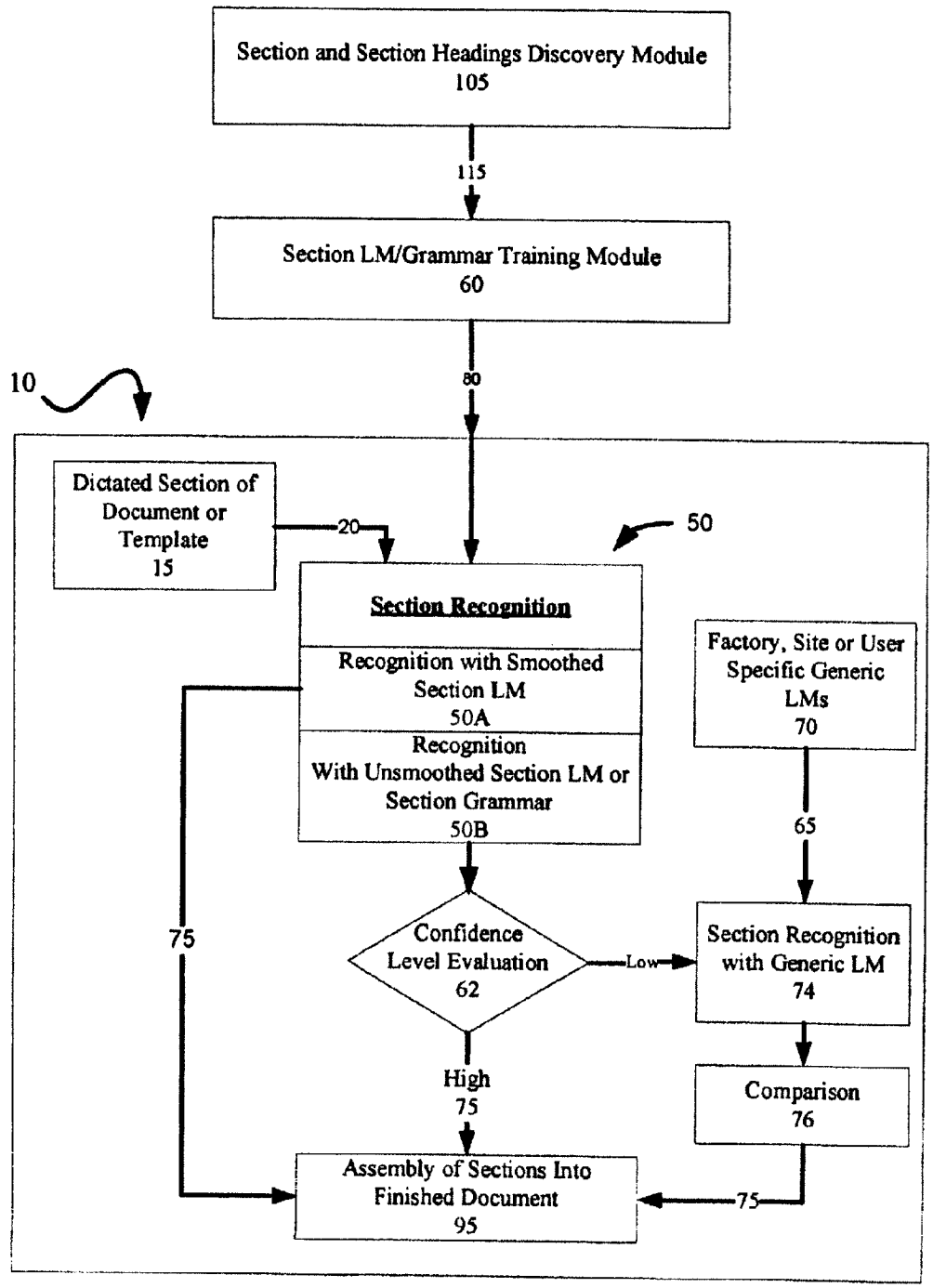
FIG. 1 is a workflow diagram of document generation with section language models and grammars according to one embodiment of the invention.

The present disclosure will now be described more fully with reference to the Figures in which at least one embodiment of the present invention is shown. The subject matter of this disclosure may, however, be embodied in many different forms and should be construed as being limited to the embodiments set forth herein.

In the various embodiments described herein, each such embodiment may be implemented through the use of a computer code mechanism structured and arranged to carry out the various steps and functions corresponding to the elements, modules or steps in the various diagrams.

In order to improve the quality of automatic speech recognition for individual speakers, dictation templates are often developed for automatic speech recognition applications that have a range of values for each slot in the template. The values for these slots can be either: (a) defined by extraction of section data from an existing corpus of documents for a given speaker; (b) defined incrementally by the data dictate over time by the speaker into these sections; or (c) defined adaptively by adjusting or revising the set of possible values already defined in advance with incrementally added values. The approach to improvement is therefore highly customized by domain, document type, and the speaker. The approach would be appropriate in any environment in which a relatively small repertoire of values is normally provided for a given section such as in the medical domain. There may be even better results to the degree that the frequency of these values deviates from a uniform distribution. Once identified, the section values may then be incorporated into speech recognition system recognition grammars or section language models, one grammar or section language model per field. These recognition grammars or section language models are selected dynamically as the focus of speech recognition shifts from section to section during the dictation process.

If the text dictated in a given section is not similar to one of the defined values, the acoustic data is re-recognized using the general vocabulary and this output then becomes the proposed contents for this section. New entries, some of which may need to be further corrected or revised, then become candidate entries for the set of values for that given section. The benefits of this approach are: (a) improved quality of structured document speech recognition; (b) dynamic development and adaptation of recognition grammars or language models, not requiring hand-crafting or labor-intensive development or data management; and (c) increased speaker satisfaction through improved quality and perceived closeness of recognition to the speaker's dictation and language usage patterns.

This approach may be used for any structured document that has sections with a limited or restricted range. Similarly, quality is further improved if the frequency distribution of these values is not uniform.

A preferred embodiment of the present invention will be implemented with and minimally diverge from existing speech recognition applications currently in the fields. Preferably existing technologies are reused in concert with the present invention such as language model and grammar tools in order to take advantage of tightly integrated software systems and maintain overall speech recognition system effectiveness.

Turning now to the Figures where embodiments of the present invention are described, FIG. 1 includes a general workflow of the present invention where section and section headings discovery module 105 feeds a combined list of section and section headings 115 into a section language model or section grammar training module 60. Module 60 is discussed in further detail below in connection with FIG. 2 and module 105 is discussed in further detail below in connection with FIG. 3 further. Module 60 outputs data 80 into document generation module 10 that may include section LM or section/grammar association, section language models and section grammar lists.

Included in document generation module 10 is module 15. This module 15 is responsible for capturing and recording a particular dictated section of a report. The output of this module is a voice recording 20, typically in the form of a .wav file or .wav buffer. Recording 20 is directed to section recognition module 50. Module 50 receives voice recording 20 and conducts speech recognition processes generating recognition output 75.

Module 50 receives voice recording 20 and the information regarding the relevant section language model or section grammar 80 and loads an identified relevant section language model or section grammar. If a smoothed section language model is loaded, then recognition is performed with smoothed section language model 50A. The output of module 50A is passed to the assembly module 95. If an unsmoothed section language model or section grammar is loaded, then recognition is performed with unsmoothed section language model or section grammar 50B. The recognition output 75 of module 50B is passed to confidence level evaluation module 63. If the confidence level is above a certain pre-determined threshold amount, output 75 is passed to the assembly module 95 where a finished document is prepared from recognized sections.

A section confidence model is a way of representing structural, syntactic, and lexical characteristics of particular text or part of text, such as a section. The representation technique or the way of modeling, can be, for example, one of those used by state-of-the-art stochastic language modeling or by information retrieval document similarity. In a preferred embodiment of the present invention, the section confidence model is implemented as an N-gram model built on a collection of text representing a particular section or group of sections. Texts used for model building are preprocessed by normalizing certain words and word phrases to some predefined types which may include patient and physician names, medications or diseases. A section confidence model created on a collection of normalized texts can score any text segment where the generated score is a measurement of the similarity or "closeness" of the scored text segment to a particular section described by the model.

Section confidence module 62 scores the recognition output against section confidence model generating a confidence score. If the generated score is lower than the predetermined threshold value, section recognition may be accomplished with a generic language model 65 from module 70. Thereafter, module 76 performs a comparison of the results for a choices of the best output is conducted. Comparison is accomplished based upon the confidence score. If the confidence score of the output generated with generic language model is higher than the confidence score of the output generated with the unsmoothed section language model or section grammar then the former is selected for further processing, otherwise section language model or a section grammar generated output may be used. Recognition output 75 may then be forwarded for assembly into a finished document in module 95.

Figure 2:
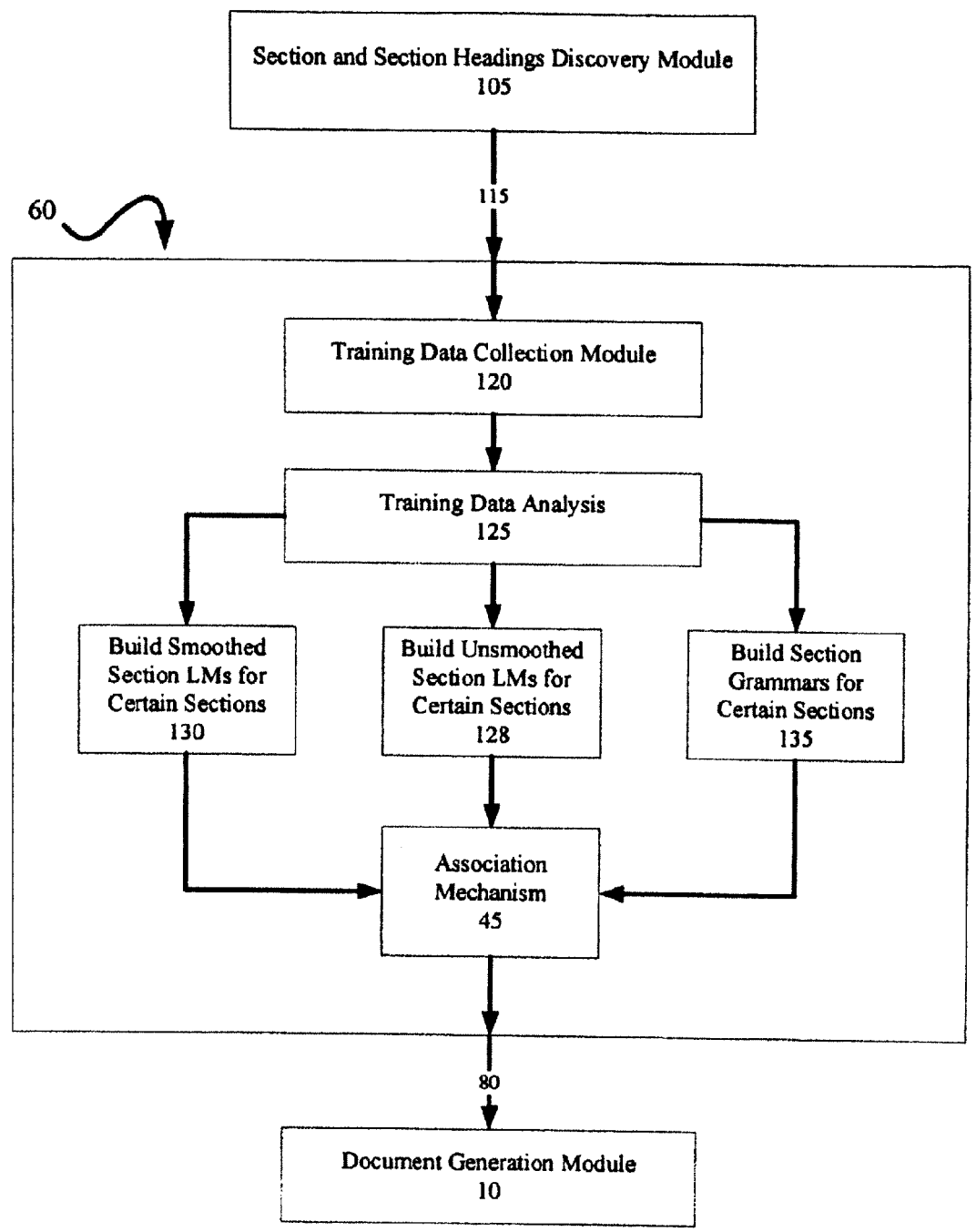
FIG. 2 is a workflow diagram of a section language model and grammars training module according to one embodiment of the invention.

Referring now to FIG. 2 there is shown a detailed view of section LM/grammar training module 60. Module 60 receives input from section headings discovery module 105 where output 115 is a combined list of sections and section headings. Training data collection module 120 receives the list of sections and section headings. Module 120 collects data for each section, each speaker and each worktype on an individual basis. Module 125 conducts training data analysis and a decision is made relevant to the information received. A determination is made as to whether or not to conduct recognition with smoothed or unsmoothed section language models.

The decision to go from module 125 to module 128 results in building unsmoothed section language models for certain sections. The decision to go from module 125 to module 130 results in building smoothed section language models for certain sections. The decision to go from module 125 to module 135 results building section grammars for certain sections.

Association mechanism 45 outputs section language models (smoothed and unsmoothed) and grammars and a list of sections with associated section language models and section grammar lists 80 for further use to the document generation module 10.

Figure 3:
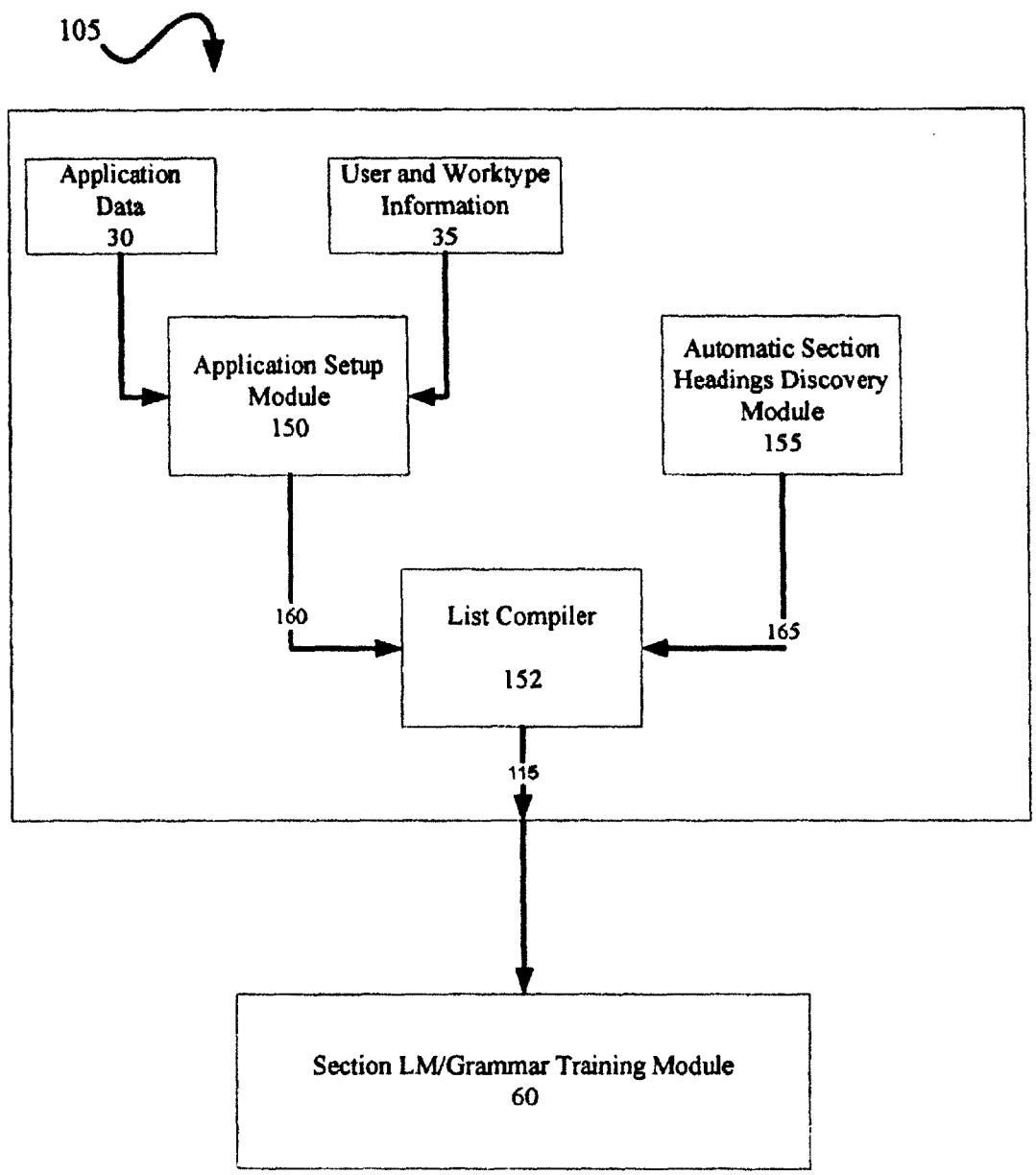
FIG. 3 is a workflow diagram of a section and section heading discovery module according to one embodiment of the invention.

Referring now to FIG. 3, there is shown a detailed representation of the sections and section headings discovery module 105 from FIG. 2. Module 105 includes application setup 150 that outputs a list of section sections and section headings 160. Module 105 also includes an automatic section headings discovery module 155 that also outputs a list of sections and section headings 165.

Section language model or section grammar association mechanism 45 (from FIG. 2) uses application data 30 passed through the application setup module 150 from the speech recognition application being implemented by the speaker. In some embodiments application data 30 includes the position of the cursor on the screen of the computer, with particular position associated with a particular section of the report.

In the case of an interactive application of an off-line application, application data 30 may provide information regarding a particular kind of section based on recognition of headings and section boundaries. Application data 30 may also include a signal representing contextual information indicating the type of application being implemented.

Additional information included in the application setup module 150 is user work type information 35. Work type information 35 may also be derived from the application setting, but may not necessarily include information about the state of the application. Work type information 35 may include personal information such as the dictator name and what type of reports he or she will be dictating.

Application setup module 150 may also include a list of available section language models and section grammars (not shown), which represent the inventory of all the modules that are available for recognition. Module 45, shown in FIG. 3, applies all of this input data, application data, user and work type information, and the inventory of the available language models and grammars, and creates the best matching pair. The output 80 of module 45 may be used for recognition, namely, section language model or section grammar association, which is implemented in module 50 as shown in FIG. 1. The information gathered and processed in module 150 is preferably derived from the knowledge of the document corpus, management system and site specific work flow processes.

List 160 may include the application defined list of sections and section headings. Module 155 outputs list 165 which may include automatically discovered lists of sections and section headings. Lists 160 and 165 may be combined to form list 115 as described in FIG. 2 above and forwarded to the section language model and section grammar training module 60, and more particularly to training data collection module 120 for analysis by training data analysis module 125. The information gathered and processed in module 155 advantageously allows a user to apply the intelligence gained to the training module.

It will be apparent to one of skill in the art that described herein is a novel system and method for applying dynamic contextual grammars and language models to improve automatic speech recognition accuracy. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for use with an automatic speech recognition system configured to recognize speech submitted to a structured document comprising a plurality of document sections, the plurality of document sections comprising a first document section and a second document section that is different than the first document section, the method comprising acts of:
    (A) recognizing first speech input submitted to the first document section using a first language model;
    (B) detecting, based on content of second speech input, that the second speech input is submitted to the second document section; and
    (C) in response to detecting that the second speech input is submitted to the second document section, recognizing the second speech input using a second language model, different from the first language model, that is specifically directed to the second document section.

2. The method of claim 1, wherein the act (C) comprises identifying the second language model for use in recognizing the second speech input from among a plurality of language models.

3. The method of claim 1, wherein the act (C) comprises selecting the second language model for use in response to the detecting in the act (B) that the second speech input is submitted to the second document section.

4. The method of claim 1, further comprising acts of:
    (D) generating a confidence score indicating a level of confidence that a result of the recognizing in the act (C) matches the second speech input;
    (E) determining whether the confidence score satisfies a confidence threshold; and
    (F) if it is determined in the act (E) that the confidence score does not satisfy the confidence threshold, recognizing the second speech input using a third language model, the third language model being different than the first and second language models.

5. The method of claim 4, wherein the third language model is a generic language model that is not specifically directed to the second document section.

6. The method of claim 1, wherein the first and second language models are stochastic language models.

7. The method of claim 1, wherein the structured document comprises a medical report.

8. At least one non-transitory computer-readable storage medium having instructions encoded thereon which, when executed in a system comprising at least one automatic speech recognition component configured to recognize speech submitted to a structured document comprising a plurality of document sections, the plurality of document sections comprising a first document section and a second document section that is different than the first document section, perform a method comprising acts of:
    (A) recognizing first speech input submitted to the first document section using a first language model;

(B) detecting, based on content of second speech input, that the second speech input is submitted to the second document section; and (C) in response to detecting that the second speech input is submitted to the second document section, recognizing the second speech input using a second language model, different from the first language model, that is specifically directed to the second document section.

9. The at least one non-transitory computer-readable storage medium of claim 8, wherein the act (C) comprises identifying the second language model for use in recognizing the second speech input from among a plurality of language models.

10. The at least one non-transitory computer-readable storage medium of claim 8, wherein the act (C) comprises selecting the second language model for use in response to the detecting in the act (B) that the second speech input is submitted to the second document section.

11. The at least one non-transitory computer-readable storage medium of claim 8, further comprising acts of:

(D) generating a confidence score indicating a level of confidence that a result of the recognizing in the act (C) matches the second speech input;

(E) determining whether the confidence score satisfies a confidence threshold; and (F) if it is determined in the act (E) that the confidence score does not satisfy the confidence threshold, recognizing the second speech input using a third language model, the third language model being different than the first and second language models.

12. The at least one non-transitory computer-readable storage medium of claim 11, wherein the third language model is a generic language model that is not specifically directed to the second document section.

13. The at least one non-transitory computer-readable storage medium of claim 8, wherein the first and second language models are stochastic language models.

14. The at least one non-transitory computer-readable storage medium of claim 8, wherein the structured document comprises a medical report.

15. A system for use with at least one automatic speech recognition component configured to recognize speech submitted to a structured document comprising a plurality of document sections, the plurality of document sections comprising a first document section and a second document section that is different than the first document section, the system comprising:

at least one processor programmed to;
recognize first speech input submitted to the first document section using a first language model;
detect, based on content of second speech input, that the second speech input is submitted to the second document section; and
in response to detecting that the second speech input is submitted to the second document section, recognize the second speech input using a second language model, different from the first language model, that is specifically directed to the second document section.

16. The system of claim 15, wherein recognizing the second speech input comprises identifying the second language model for use in recognizing the second speech input from among a plurality of language models.

17. The system of claim 15, wherein recognizing the second speech input comprises selecting the second language model for use in response to the detecting that the second speech input is submitted to the second document section.

* * * * *